Sept. 1, 1964  H. E. HALL, JR  3,147,378
RADIOACTIVITY WELL LOGGING
Filed June 15, 1959  2 Sheets-Sheet 2
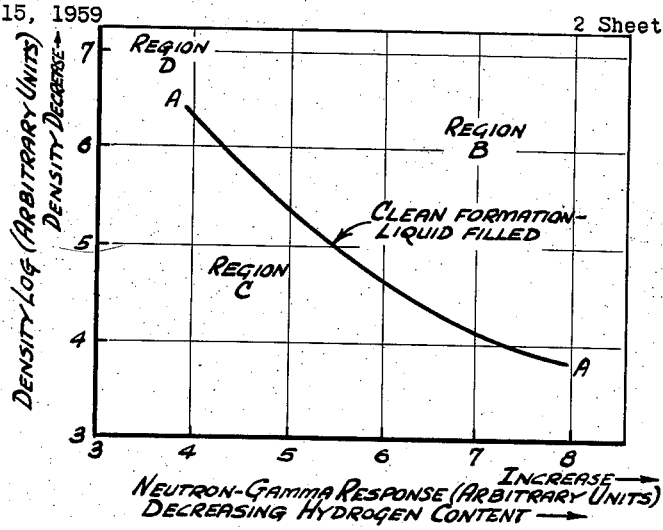
Fig. 7.
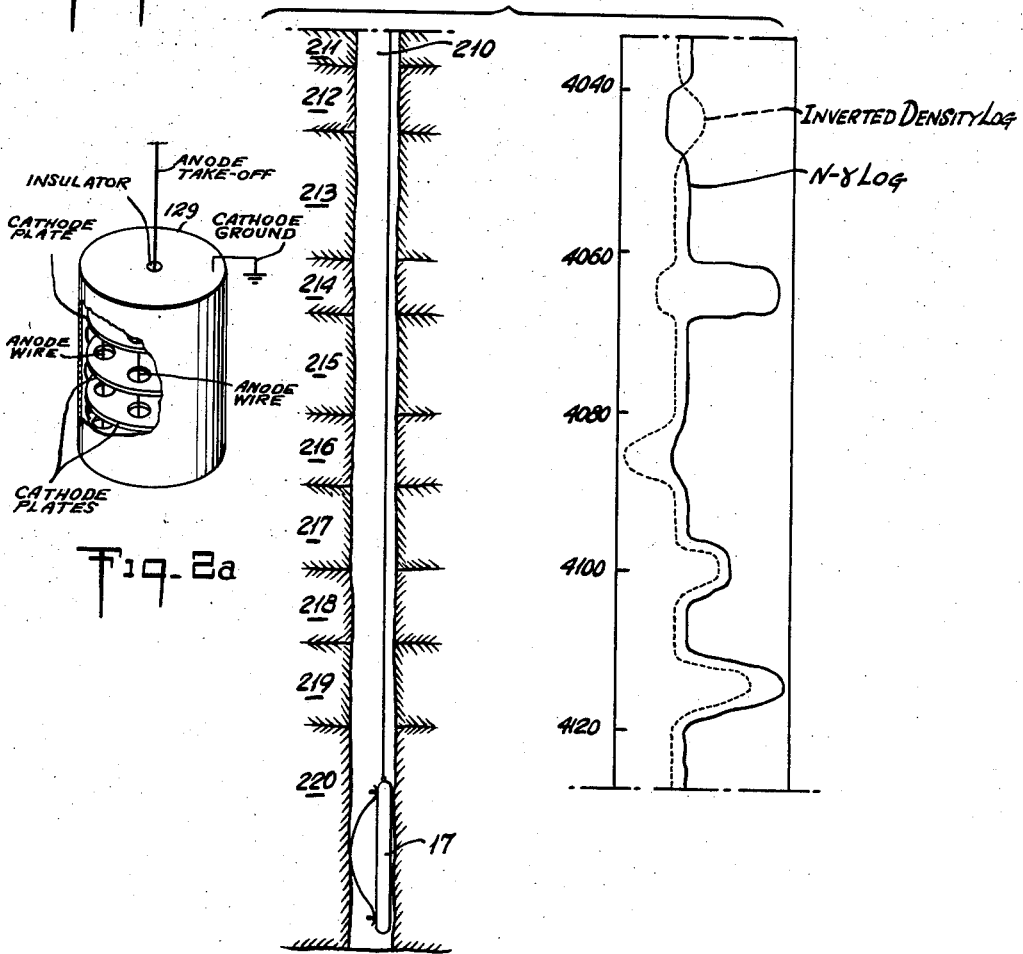
Fig. 8.
Fig. 2a United States Patent Office 3,147,378
Patented Sept. 1, 1964

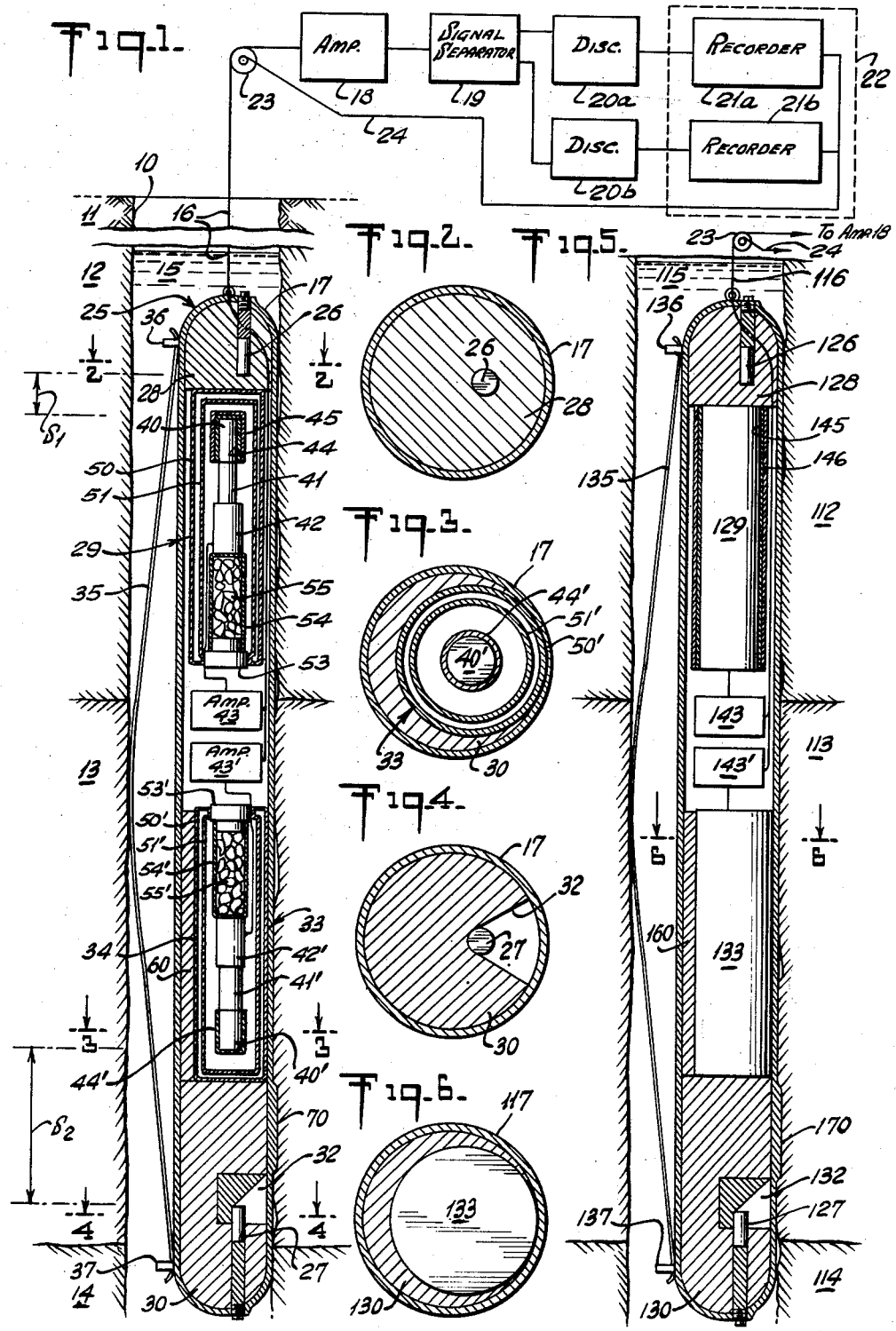

3,147,378
RADIOACTIVITY WELL LOGGING
Hugh E. Hall, Jr., Houston, Tex., assignor to Texaco Inc., New York, N.Y., a corporation of Delaware
Filed June 15, 1959, Ser. No. 820,239
8 Claims. (Cl. 250—71.5)

The present invention relates generally to the determination of the nature of earth formations; and, more particularly, it is concerned with analysis of earth formations along the traverse of a bore hole through irradiation of the formations with penetrative radiations in order to cause certain observable effects which are detected as an indication of the nature of the formations. Accordingly, it is a general object of the present invention to provide improvements in radioactivity well logging wherein penetrative radiation is employed to cause observable effects indicative of the nature of the earth formations along the well bore.

It is well known to analyze earth formations in situ along the traverse of a bore hole through the use of various radioactivity analysis techniques. For example, it is possible to determine the presence of porous zones along the path of the bore hole through the use of scattered gamma ray, neutron-neutron, or neutron-gamma ray logs in accordance with known techniques. It has been suggested that a plurality of these logs may be conducted simultaneously by the use of a combination logging instrument to reduce the time required to conduct the logs. Such well logs are disclosed, for example, in U.S. Patent 2,345,119, issued on March 28, 1944, as the result of an application filed June 26, 1940, by D. G. C. Hare, and in U.S. Patent 2,648,780, issued on August 11, 1953, as the result of an application filed June 15, 1950, by G. Herzog.

The present invention is especially directed toward improvements in combination well logging for quantitatively determining in situ the presence of hydrocarbon oil or gas in earth formations traversed by a bore hole. Accordingly, it is a more particular object of the present invention to provide improvements in radioactivity well logging wherein the formations are irradiated to produce observable radiation effects which are detected and measured as an indication of the presence of oil or gas in the earth formations along the well bore.

It is still another object of the present invention to provide improved methods and apparatus for quantitatively distinguishing between hydrocarbon oil and gas contained in the pores of an earth formation traversed by a bore hole and which is relatively insensitive to the adverse effect of certain other interfering substances which may also be present in the earth formations.

Briefly stated, the present invention is concerned with improvements in radioactivity well logging wherein separate sources of neutrons and gamma rays are passed through a bore hole to irradiate the formations traversed by the bore hole and wherein radiation resulting from the neutron irradiation is detected in a first zone spaced from the neutron source to provide a first signal primarily indicative of hydrogen and gamma radiation resulting from the gamma ray source is detected in a second zone spaced from the gamma ray source and from said first zone to provide a second signal primarily indicative of the density of the irradiated formations. The invention contemplates that the effect on the neutron-induced signal due to any chlorine which may be present in the formation or bore hole is neutralized. The first zone is spaced sufficiently far from the gamma ray source to avoid interference therefrom. Likewise, the second zone is spaced sufficiently far from the neutron source to avoid interference from radiation resulting therefrom. The two signals are recorded in correlation with the position of the logging instrument in the bore hole. The porosity signal provides a quantitative indication of the hydrogen content in the formation and the scattered gamma ray signal provides a quantitative indication of the density of the formation. The correlated signals are interpreted to determine liquid and gas contents of the formations.

A preferred aspect of the invention involves the use of improved apparatus for conducting such a method, which apparatus involves an elongated instrument housing suitable to be passed through a bore hole and containing separate neutron and gamma ray sources, respectively positioned at opposite ends of the instrument for irradiating the earth formations along the bore hole. Spaced a predetermined distance from the neutron source along the longitudinal axis of the instrument, there is provided a radiation detection unit sensitive to radiation resulting from the neutron source comprising a gamma radiation detector having its active volume substantially surrounded by a thin layer of neutron reactive material, such as cadmium. A second detection unit sensitive to gamma radiation scattered from the gamma ray source is also provided in the instrument and is spaced a predetermined distance from the gamma ray source. The detector of the first unit is spaced sufficiently far from the gamma ray source to avoid substantial interference therefrom. Likewise, the second detector is spaced beyond the range of interfering radiation resulting from the neutron source. The electronic signal handling equipment for the two detection units is advantageously located in the space between the two detectors. Means are further provided for maintaining the position of the logging instrument in relatively fixed relation against the side of the bore hole during the source of the logging run.

For additional objects and advantages and for a better understanding of the invention, attention is now directed to the following description and accompanying drawings. The features of the invention which are believed to be novel are particularly pointed out in the appended claims.

In the drawings:

FIGURE 1 is a schematic representation showing a vertical elevation through a portion of a bore hole having a well logging instrument suspended therein and which is constructed in accordance with principles of the invention;

FIGURE 2 illustrates a cross-sectional view through the lines 2—2 of the instrument shown in FIGURE 1;

FIGURE 2A is a diagrammatic representation of a multiple plate cathode type counter of the type which may be employed as the detector 129 or 133 in the embodiment illustrated in FIGURE 2;

FIGURE 3 illustrates a cross-sectional view through the lines 3—3 of the instrument shown in FIGURE 1;

FIGURE 4 illustrates a cross-sectional view through the lines 4—4 of the instrument shown in FIGURE 1;

FIGURE 5 is a schematic representation similar to FIGURE 1 showing another form of logging apparatus embodying principles of the invention;

FIGURE 6 illustrates a cross-sectional view through the lines 6—6 of the instrument shown in FIGURE 5;

FIGURE 7 shows a graph illustrating a method of plotting the signals derived by a logging instrument such as that shown in FIGURES 1 and 5; and FIGURE 8 is a diagrammatic representation of a typical logging record which may be made in accordance with the teachings of the present invention.

Referring now to FIG. 1 of the drawings, there is shown a bore hole 10 traversing a plurality of earth formations 11, 12, 13 and 14. The bore hole 10 is shown containing a fluid 15 such as water, crude oil, or drilling fluid, for example. Suspended within the bore hole 10, as by means of a cable 16, there is shown a well logging instrument 17 constructed in accordance with principles of the invention for deriving hydrogen content and density signals as hereinafter described. The cable 16 may include an outer conductive sheath together with one or more additional inner conductors (not individually shown) in order to afford means for transmitting electrical signals between the instrument 17 and electrical apparatus at the surface of the earth. The surface equipment provides means for receiving signals transmitted from the logging instrument 17 and amplifying and segregating the received signals as necessary for recording purposes. The surface apparatus includes an amplifier 18 having its output side connected to a signal separator 19 for separating different signals transmitted over the cables from the logging instrument, as discussed in greater detail below. The detailed operation of the separator 19 depends upon the method employed to send the separate signals from the logging instrument to the surface. Thus, the separator 19 may function to separate the signals according to amplitude, frequency, polarity, pulse width, etc. as the case may be. One output path from the separator 19 passes through a first pulse-height discriminator 20a to a first display device in the form of a recorder 21a and the other output path from the separator 19 passes through a second pulse-height discriminator 20b to a second display device in the form of a recorder 21b. It is to be understood that the two recording devices 21a, 21b may be separate recorders; however, they preferably comprise separate channels of a multi-channel recorder, as indicated by the dashed box 22 enclosing the two recording devices 21a, 21b. In any event, the signal display apparatus shown as the recorders 21a, 21b is understood to comprise ratemeter circuitry including such pulse-shaping networks as may be necessary or desirable for providing a record of the intensity, i.e., rate-of-occurrence, of detected radiation. Although illustrated as part of the surface equipment, it is to be understood that the discriminator apparatus may advantageously be located within the logging instrument 17. It is also possible to include the ratemeter circuitry in the instrument 17 and transmit signals that are proportional to the average intensity over the cable 16 to the surface, rather than transmit each radiation detector pulse or a fixed percentage thereof by means of a scaler.

In order to correlate the position of the logging instrument 17 in the bore hole 10 during the well log, there is provided at the surface a measuring apparatus 23, represented diagrammatically as a wheel having its perimeter in contact with the cable 16, for sensing movements of the cable 16 in and out of the bore hole 10. The measuring apparatus 23 may be any known device of this type suitable for determining the position of the logging instrument 17 in the bore hole 10 and may advantageously be of the type which provides an electrical output signal which may be transmitted as by means of the conductive circuit 24 to the recorders 21a, 21b for correlating the recorded logging signal with the position of the logging instrument in the bore hole throughout the well log.

The logging instrument 17 comprises an elongated outer shell-like housing or casing 25 formed conventionally of steel in accordance with known techniques to withstand the pressures and temperatures commonly encountered in the well logging art. Advantageously, the housing should be of such character as to withstand the conditions that may be found in bore holes upwards of ten or twenty thousand feet in depth.

The upper portion of the casing 25 contains a neutron source 26 for bombarding the earth formations along the bore hole with neutrons, together with appropriate radiation detection equipment for detecting gamma rays induced in the formation as the result of irradiation by the source. The lower portion of the casing 25 contains a gamma ray source 27 for irradiating the formations with gamma rays along with detection equipment sensitive to gamma rays returning to the bore hole due to the irradiation by the gamma ray source. Appropriate electrical circuitry is also enclosed within the casing in the space between the two detectors for amplifying and otherwise handling the output signals from the radiation detection equipment for transmission over the cable 16 to the surface equipment. In particular, the neutron source 26 is shown positioned within a source chamber in the upper end of the housing 25 and surrounded by a neutron-permeable shield 28 of lead or tungsten, for example, to prevent gamma radiation which may also be emitted thereby from passing either directly or indirectly to the detection equipment. The source chamber may advantageously comprise a tubular hole bored in the shield 28 off-center as indicated or centered in the logging tool. An access hole is provided in the upper end of the casing 25 for inserting or removing the source without disturbing the other equipment in the logging instrument. The source chamber is sealed by means of a cover plug screwed into the access hole in the casing of the instrument. Alternatively, the top end of the tool case may be removed and the source inserted. The neutron source 26 may be of known type including those comprising an alpha ray emitter and a target material which emits neutrons in response to the alpha rays. For example, the alpha emitter may include radium, polonium, radium D, actinium 227 or plutonium and the target may include beryllium. In the upper portion of the instrument 17, spaced a predetermined distance S–1 from the neutron source 26, there is positioned a first radiation detection unit 29, which together with its associated circuitry is adapted and arranged to provide an output signal that is proportional to gamma radiation, and primarily that gamma radiation emitted from the adjacent earth formations as the result of interaction of neutrons from the source 26 with hydrogen in the formation while being substantially unaffected by the presence of chlorine in the formation, as discussed in detail below. The upper detection unit 29 is hereinafter referred to as the first detector or the neutron-gamma detector.

The gamma ray source 27 is shown positioned within a source chamber in the lower end of the housing 25 and substantially surrounded on all sides by gamma ray shielding material 30, except for an opening or collimated slot 32 for directing gamma rays toward a formation to be logged while minimizing the passage of gamma rays into the bore hole. The source chamber for the gamma ray source is substantially like the neutron source chamber. Likewise, an access hole and removable cover plug are provided in the lower end of the casing 25 for inserting or removing the gamma ray source, as in the case of the neutron source. The gamma ray source 27 may be of known type such as radium or cobalt 60, for example. The gamma ray shield 30 may be formed of lead or tungsten or preferably it may be formed of a high density machineable tungsten alloy such as that marketed as "Mallory 1000." The shield 30 may conveniently be formed of separate pieces of shielding material as shown in the drawing in order to simplify machining thereof. Preferably, the gamma ray source is positioned relatively close to the sensitive side of the logging instrument facing toward the formation to be logged, as shown in the drawing, in order to permit increased shielding behind the source to the rear of the collimating slot 32. Spaced a predetermined distance S–2 above the gamma ray source 27 there is provided a second radiation detection unit 33 which, together with its associated circuitry, is adapted and arranged to provide an output signal that is proportional to the gamma radiation scattered back from the formation as a result of irradiation by the gamma source 27. The lower detection unit 33 is hereinafter referred to as the second detector or as the scattered gamma ray detector. Preferably, the scattered gamma detector is also positioned relatively close to the sensitive face of the logging instrument in order to permit the use of a gamma ray shield 34 for minimizing the detection of any scattered gamma radiation which may pass through the bore hole rather than the formation.

The respective detector units 29, 33 are spaced from one another sufficient distance to assure that each is substantially unaffected by the radiation source associated with the other detector. In a liquid filled bore hole it has been determined that each detector should advantageously be at least 6 feet away from the source from which interference is to be avoided. The electronic equipment for the respective detectors is preferably positioned intermediate the two detectors in the logging instrument, as shown, in order to provide for optimum utilization of space within the logging instrument consistent with maximum spacing between each of the radiation sources and the respective detector whose radiation is to be avoided.

In order to stabilize the position of the logging instrument 17 throughout a logging run and to assure that both the neutron-gamma and scattered gamma logs are directed to the same side of the bore hole, there is provided a decentralizing bow spring 35 having its upper and lower ends 36 and 37 mounted to the logging instrument 17 in such manner that the spring 35 is free to flex as the instrument 17 is moved past irregularities in the side of the bore hole. Conventionally this may be achieved by mounting the upper and lower ends of the bow spring 35 in slidably engageable relationship to the instrument 17, as by means of elongated slots (not shown) in the bow spring 35.

The first or neutron-gamma detector 29 comprises a scintillation detector including a gamma ray sensitive luminophor 40, advantageously in the form of a sodium iodide crystal, together with a photomultiplier tube 41 shown mounted adjacent the luminophor 40 for detecting the photon output pulses from the luminophor and providing an electrical signal proportional thereto. The photomultiplier tube is shown adjacent a preamplifier 42 which, in turn, is shown electrically connected to additional electrical equipment identified as an amplifier 43 for transmission of an output signal derived from the photomultiplier tube 41 to the surface equipment by means of the cable 16. It is to be understood that the photomultiplier tube 41 is energized by means of a high voltage source (not shown) which may comprise batteries positioned in the logging instrument 17 or, more conventionally, may involve the use of power supply equipment including a transformer and rectifier in the logging instrument for deriving appropriate high direct current operating potential from electric power transmitted as alternating current from the surface to the logging instrument in the bore hole. It is to be further understood that the amplifier 43 may actually include any additional circuitry required for handling the transmission of the signal information to the surface in accordance with principles well known in the art. For example, the radiation detector signals may be transmitted to the surface as amplitude modulated signals, or may be transmitted in the form of frequency modulated signals, in accordance with well-known techniques. If a so-called single conductor cable is employed, the respective signals from the separate detectors may be transmitted simultaneously as pulses of different polarity or as signal information on carriers of different frequency, for example. The luminophor 40 is shown mounted within a conventional aluminum container 44 which serves to protect it from moisture and physical damage. The upper end of the container 44 facing the photomultiplier 41 is also shown as open, with the luminophor 40 in direct contact with the photomultiplier 41. However, it is to be understood that the container 44 may be sealed with a transparent cover of glass or plastic in a manner known in the art. Surrounding the container 44 there is provided a thin layer 45 of a neutron absorbing material, such as cadmium, which emits a plurality of gamma radiations upon capturing a neutron and which, as hereinafter discussed, functions in combination with other elements of the invention to render the signal derived by the neutron-gamma detector primarily sensitive to hydrogen and relatively insensitive to the effect of chlorine.

In order to insure that the hydrogen detector 29 is primarily responsive to the neutron-capture gamma rays due to hydrogen and not the natural gamma radiation or scattered gamma radiation from the neutron source 26, the discriminator associated therewith should advantageously be biased to exclude these undesirable lower energy gamma rays. Preferably, the discriminator should be biased so that the measured radiation signal is indicative of gamma rays having an electron energy of about 1.8 million electron volts and above as will be discussed later. This particular bias level, in combination with the 2" x 4" sodium iodide crystal and a cadmium layer for the neutron absorbing material 45 which surrounds the luminophor 40 at a source-to-detector spacing of 16 inches operates to provide a very satisfactory logging signal which is primarily responsive to the hydrogen content of the formations, due to radiation resulting from irradiation of the formation by neutrons from the source 26. By thus biasing the detector to exclude lower energy gamma rays, most of the natural gamma radiation present in the formation and any gamma radiation scattered from the source is likely to be eliminated from the detected signal, since the natural and scattered gamma radiations are both of relatively low energy level.

In accordance with the so-called neutron-gamma ray logs, a source of neutrons is passed through the bore hole in order to irradiate the earth formations along the traverse of the bore hole. The neutrons from the source are slowed down in the formation and bore hole fluid, primarily due to the effect of hydrogen, and after being slowed to the thermal range the neutrons are captured by material of the formation with the resultant emission of gamma rays. These neutron-gamma rays are detected and their intensity, i.e. rate-of-occurrence, is determined as a measure of the hydrogen content of the formations.

When the thermalized neutrons are captured by hydrogen, gamma rays having a characteristic energy of 2.2 million electron volts are emitted by the hydrogen responsible for the capture. When only hydrogen is present in the pores of the region under investigation, the intensity, i.e. rate-of-occurrence, of the detected gamma radiation provides a good quantitative indication of the hydrogen content of the formation. However, it has been determined that other materials which may also be present in the formation can have an adverse effect on the neutron-gamma ray well log and which may render the log unreliable as a hydrogen measurement. Of particular significance is the presence of chlorine which has a relatively high capture cross-section for thermal neutrons, as compared with that of hydrogen. In particular, chlorine has a neutron capture cross-section of about 32 barns, whereas hydrogen has a neutron capture cross-section of about .33 barn. Thus, chlorine is approximately 100 times more effective in capturing thermal neutrons than hydrogen. When a thermal neutron is captured by chlorine, rather than hydrogen, about 3.1 gamma rays (on the average) are emitted per capture as compared with one gamma ray per capture by a hydrogen atom. In addition to the foregoing, many of the gamma rays emitted by chlorine are of higher energy range, from about 4–8 mev., than the characteristic 2.2 mev. gamma rays of capture emitted by hydrogen. In view of the foregoing the presence of even a small amount of chlorine will ordinarily increase the intensity of the gamma radiation detected by the neutron-gamma ray instrument, thus giving a false indication of hydrogen content in the resultant log.

The neutralization of the adverse effect of chlorine upon the neutron gamma ray well log described above is accomplished by subjecting the gamma ray detector to radiation which varies inversely with the effect upon the detector due to the presence of chlorine. Chlorine has a relatively high capture cross-section and emits a plurality of gamma rays in response to the capture of each neutron. Thus, the counting rate of the gamma ray detector is increased due to the presence of chlorine. In order to neutralize the effect of chlorine a gamma ray signal is developed whose intensity decreases correspondingly due to the presence of chlorine. This may be accomplished by developing a gamma ray signal whose intensity is proportional to the thermal neutron flux in the vicinity of the detector. This is due to the fact that chlorine absorbs or removes thermal neutrons from the environment of the detector due to its relatively high capture cross-section. Thus, the thermal neutron flux in the vicinity of the detector is reduced due to the presence of chlorine. By introducing a neutron-absorbing material which emits a plurality of neutron capture gamma radiations in the vicinity of the detector, thermal neutrons are absorbed in said material which result in the emission of gamma radiation which is detected by the gamma ray detector. Using a sodium iodide detector, the thickness of cadmium needs to be at least enough to absorb most of the thermal neutrons and the balance is achieved by adjusting the discriminator bias. When the logging instrument passes into a region containing chlorine from an identical region with the exception that no chlorine is present, the counting rate of the gamma ray detector tends to increase due to the increase of the number of capture gamma rays directly attributable to the chlorine. However, when this occurs, the number of thermal neutrons available for capture by the neutron absorbing material around the detector is reduced thus tending to decrease the counting rate in the gamma ray detector. By suitable means, these two effects may be made to cancel one another, so that when a logging tool using this system is passed from a formation containing chlorine to one not containing chlorine but have the same porosity, formation matrix, and hydrogen content, the response remains constant.

In the apparatus shown in FIG. 1, the above-mentioned two effects may be made equal and opposite either by adjusting the bias of the discriminator, by adjustment of the amount of the neutron absorbing material 45, or by a combination of the first two techniques. For example, the neutron absorbing material 45 may be a sheet of cadmium surrounding the crystal 40 at such a thickness, i.e. .025", that it essentially captures all of the thermal neutrons which diffuse to the layer of cadmium. The rise in the capture gamma component may be balanced against the thermal neutron component by a discriminator setting of approximately 1.8 mev. for a source-to-detector spacing of 16". The discriminator bias will be in the range from 1 to 2.5 mev. depending upon the detector-to-source spacing, the dimension of the crystal, the case thickness, the case material, the diameter of the bore hole and the salinity of the fluid.

At lower bias settings, there is more thermal neutron component than is necessary, and at higher bias settings there is less than is needed. Thus, in accordance with one aspect of the invention the bias may be set, for example, at 1.0 mev. and the thickness of cadmium adjusted so that the two effects cancel. In carrying out this aspect of the invention an additional neutron absorbing material, such as boron or lithium, should be placed between the crystal and the cadmium, and which is sufficiently thick to absorb and thermal neutrons transmitted through the cadmium. This is desirable since neither boron nor lithium emit neutron capture gamma rays above 1.0 mev. and the crystal would not become activated. This aspect may be carried out with the hydrogen detector of FIG. 1 by the addition of a layer of neutron capturing material, such as boron, between the neutron interaction material 45 and the luminophor 40.

While cadmium is preferred as the interaction material for capturing the thermal neutrons in the vicinity of the detector in order to neutralize the effect of chlorine upon the neutron gamma ray log, it is to be understood that other materials may be employed rather than cadmium and that other materials may be employed together with cadmium. In the present case, where the cadmium is employed in a logging instrument having a steel instrument casing or housing, the iron of the logging instrument actually cooperates with the cadmium. Iron has a much lower capture cross-section for neutrons than cadmium, however, there is a relatively large quantity of iron present in the vicinity of the detector, hence, its effect is similar to that of the cadmium. Iron has a thermal neutron capture cross-section of 2.43 barns compared with a capture cross-section of about 3500 barns for cadmium. Iron emits neutron capture gamma rays ranging up to 9.3 mev., whereas cadmium emits gammas up to 9.05 mev. upon capture of thermal neutrons. Gadolinium may also be employed in carrying out the invention. Gadolinium has a capture cross-section of 36,300 barns and emits neutron capture gammas up to 7.78 mev. As mentioned above, chlorine, the effect of which is to be balanced out of the resultant detected gamma ray signal, has a capture cross-section of about 32 barns and produces neutron capture gamma rays up to about 8.56 mev.

Whether cadmium or other material having similar characteristics or a combination of such materials is employed, such as the combination of cadmium with the steel logging casing, it is important that the sum total of such material used having a predetermined net effect which results in the development of a gamma ray signal in response to the thermal neutron population in the immediate vicinity of the detector which just cancels out the capture gamma effect due to the presence of chlorine in the bore hole and formation in the vicinity of the detector.

In a preferred embodiment employing a neutron source comprising 200 mc. of Ra:Be, a sodium iodide crystal radiation detector of 4" length and 2" diameter biased at 1.8 mev., and having its near side spaced from the neutron source a distance of 16", it has been found that with a steel logging casing having a thickness of 5/16" a cadmium sleeve greater than 10 mils in thickness provides very satisfactory cancellation of the adverse effects of chlorine on the neutron-gamma ray log in formations having average ranges of porosity and salinity which are 10–30% porosity and salinities from zero to saturation.

In order to stabilize and protect the scintillation logging equipment against the effects of high bore hole temperatures and variations thereof, the luminophor 40 and photomultiplier tube 41, as well as the preamplifier 42, are all shown mounted within an insulated chamber preferably in the form of a Dewar flask comprising an outer wall 50 separated from an inner wall 51 by an evacuated space. The insulating chamber is provided with an appropriate removable insulating cover plug 53. Within the Dewar flask, advantageously affixed to the inside of the insulated cover plug 53, there is provided a coolant chamber 54 having thermally conductive walls as of thin aluminum and containing a quantity of ice 55. The coolant chamber 54 including the ice 55 affords means for maintaining the scintillation detection equipment in a stable, low temperature environment by virtue of the temperature stability afforded as the ice undergoes a change of state from the solid to the liquid phase during the logging operation. It is to be understood that other techniques for stabilizing the temperature of the instrument may be employed, for example, as shown and described in U.S. Letters Patent No. 2,824,233, granted February 18, 1958, to Gerhard Herzog.

The second or scattered gamma ray detector unit 33 comprises a scintillation detector generally like that employed as the neutron-gamma ray detector 29 and corresponding elements of the scattered gamma ray detector bear the same reference numeral as those of the neutron-gamma ray detector but with a prime designation. The scattered gamma ray detector differs from the neutron-gamma ray detector by the omission of the neutron interacted material such as cadmium. Moreover, the scattered gamma ray detector is not biased like the neutron gamma detector. In particular, the scattered gamma ray detector is adapted and arranged to be sensitive primarily to scattered gamma rays resulting from the gamma ray source 27. Provided the source 27 is of sufficient strength, the intensity of the scattered gamma radiation will override any natural gamma radiation present in the formation to assure an adequate signal-to-noise ratio. However, it is possible to utilize a pulse-height discriminator for selective amplitude measurement of the detected gamma radiation to emphasize the scattered gamma radiation, as compared with any natural gamma radiation which may be present. When utilizing a gamma ray source of the order of 200 milligrams of radium it has been found that the natural background radiation may be adequately overcome. In such case the detected scattered gamma rays have an average energy of .3 mev.

In order to emphasize the detection of scattered gamma rays affected by the intervening earth formations to the exclusion of any gamma rays which may be scattered through the bore hole from the source, the scattered gamma ray detector is preferably positioned relatively close to the sensitive side of the logging instrument in order to provide space on the side remote from the sensitive side thereof for gamma ray shielding material 60 such as lead or the like, as shown in the drawings.

Especially in the case of the gamma ray log it is also important to assure that the logging instrument is maintained a constant predetermined distance from the side of the bore hole during the logging run, despite variations in mud cake along the face of the bore hole. Toward this end, there is provided an elongated rib member 70 along the sensitive side of the logging instrument 17 between the gamma ray source 27 and the scattered gamma ray detector 33 for cutting through any mud cake that may be present and maintaining the sensitive face of the instrument 17 a fixed distance from the side of the bore hole 10.

It is to be understood that the output signal from the scattered gamma ray detection equipment is transmitted to the surface in a manner generally like that described above with regard to the neutron-gamma ray signal.

In a preferred embodiment a scattered gamma ray source comprising 200 milligrams of radium has been employed with a scattered gamma ray detector comprising a sodium iodide crystal of 4 inches in length and 2 inches in diameter having its near side spaced from the gamma ray source a distance of 12 inches.

Referring now to FIG. 5, there is shown another embodiment of the invention wherein elements corresponding to those of the apparatus shown in FIG. 1 are identified with reference numerals having a value of 100 plus the value of the numeral applied to the corresponding element of FIG. 1. Thus, for example, the bore hole 10 and formations 11–14 of FIG. 1 correspond to the bore hole 110 and the formations 111–114 of FIG. 5.

Whereas the apparatus of FIG. 1 discloses gamma ray detection apparatus of the scintillation type, the detection apparatus of FIG. 5 involves the use of high efficiency electrical pulse producing type detectors of the type disclosed in U.S. Patent 2,397,071 in the name of D. G. C. Hare. These detectors, which may for convenience be referred to as high efficiency multiple plate cathode type geiger counters, enable the construction of a very reliable neutron-gamma ray well logging instrument embodying principles of the invention and which affords certain advantages as compared with apparatus involving scintillation type detectors.

In particular, the upper or neutron-gamma ray detector 129 of the logging instrument shown in FIG. 5 is in the form of a high efficiency multiple plate pulse counter having a thin layer or sleeve 145 of material such as cadmium surrounding its active volume in order to render the signal of the hydrogen detector 129 insensitive to chlorine, as discussed above with respect to the apparatus of FIG. 1. The detector 129 is not provided with a pulse-height discriminator as in the case of the scintillation apparatus as is shown in FIG. 1. The unwanted lower energy gamma radiation is excluded from the signal of the detector apparatus of FIG. 5 by means of appropriate shielding around the detector. In particular, surrounding the sleeve 145 of cadmium there is provided a gamma ray shield 146 which may be formed of lead or the like for preventing scattered and other low energy gamma radiation from interfering with the induced gamma ray measurement. It has been found that a shield of ¼ inch thick lead, or equivalent gamma ray absorbing material, is satisfactory for shielding of the detector 129 from unwanted lower energy gamma radiation.

In the apparatus shown in FIG. 5, the upper detector is sensitive to gamma radiations having energies above a few kev. Therefore, in order to make this log insensitive to the chlorine content in the volume surrounding the detector, the capture gamma component of the response may be balanced against the thermal neutron component only by varying the amount of neutron absorbing material 145 in the vicinity of the detector 129. Various neutron absorbing materials may be used as previously discussed. For example, a sheet of cadmium sufficiently thick to capture all of the thermal neutrons which get to the cadmium, placed around a 2" x 4" gamma radiation detector as previously described, over compensates or, in other words, introduces a thermal neutron component in the response which is too large. The amount of cadmium may be reduced slightly, i.e. by cutting holes in it, to afford the correct degree of compensation. To afford the correct degree of compensation, approximately 25% of the thick cadmium sheet should be removed by cutting small holes uniformly spaced over the detector. Alternatively, one could reduce the thickness of the cadmium sheet to approximately .004" to accomplish the same purpose.

The lower or scattered gamma ray detector 133 is substantially like the upper or neutron gamma ray detector 129, except that it is not provided with the neutron reactive layer of cadmium or the like. Moreover, rather than a gamma ray shield completely surrounding it, as with the neutron gamma detector, the scattered gamma ray detector 133 is provided with a shield of gamma ray absorbing material only on the side thereof remote from the sensitive face of the logging instrument which is urged against the bore hole. The shield may conveniently be somewhat crescent shaped in cross-section as illustrated in te drawings and its purpose is to reduce the likelihood of interference from gamma radiation which may be scattered in the bore hole rather than in the gamma-irradiated formations.

Utilizing a high efficiency multiple plate geiger counter 14" long and 2" in diameter, it has been found that the upper detector should be spaced 14" from the source. Utilizing a high efficiency multiple plate geiger counter 14" long and 2¾" outside diameter, it has been found that the lower detector should be spaced 12" from the source.

Preferably, the cathode of the neutron gamma detector should be formed of relatively low atomic number material whereby it is primarily sensitive to the higher energy induced gamma rays. Likewise, the cathode of the scattered gamma detector should be formed of higher atomic number materials whereby the detector is preferentially sensitive to the lower energy scattered gamma rays. Preferred materials for the scattered gamma ray detector include tantalum and tungsten. Preferred material for the induced gamma ray detector includes stainless steel.

With the apparatus shown in FIG. 1, which utilizes scintillation counters in combination with discriminator apparatus, the neutron source may comprise a radium-beryllium source which emits significantly lower energy gamma radiation along with the neutron radiation, or a substantially gamma-free neutron source such as actinium 227 and beryllium or radium D and beryllium. However, in the case of the apparatus shown in FIG. 5, it is preferable to use a neutron source whose gamma ray emission is at least as low as that of an actinium 227 and beryllium source or equivalent. This enables the use of ¼" lead shielding around the neutron-gamma ray detector to eliminate the relatively small amount of adverse lower-energy gamma radiation from the measured radiation signal.

In order to conduct a logging run with the herein disclosed apparatus the instrument 17 is preferably lowered below the region of the well to be logged and drawn upwardly through the well at a predetermined constant rate while the outputs of the two detector units 28 and 29 are transmitted over the cable 16 to the surface equipment where they are channeled to the appropriate recording device. The intensity, i.e. rate-of-occurrence of the detected radiation in each of the two channels is recorded in correlation with the location of the logging instrument in the bore hole. The neutron-gamma ray detector provides a signal which is indicative of the hydrogen content of the formations along the bore hole. The scattered gamma ray log in correlation therewith shows whether the indicated hydrogen content is present in a gas or liquid phase. In particular, using a long-spaced neutron-gamma log, i.e. with the detector spaced beyond the critical distance where changes in hydrogen content do not affect the detected gamma ray signal intensity, a high neutron gamma response is indicated in low porosity zones or in dry gas zones. These zones of high response on the neutron-gamma ray log may be due either to gas or liquid containing formations. The scattered gamma ray density log indicates whether gas is present in a low density zone or whether liquid is present, since the density of the gas zone is lower than that of the liquid filled zone of the same hydrogen content. The scattered gamma intensity is higher in dense zones than in others.

Various methods may be employed to analyze the data obtained by the two logs. One method is to plot the scattered gamma density log vs. the neutron-gamma hydrogen content log. For clean liquid filled formations of the same matrix density and varying porosities and for a given casing or bore hole size, the locus of points thus plotted is in the form of a curved line A—A such as that shown in FIG. 3. Plotted depths falling in region C are indicative of shales, since the neutron-gamma log generally decreases more than is expected on the basis of a porosity change. Washouts fall in region D since the density log is high (indicating low density), and the neutron-gamma log is low (indicating a large amount of hydrogen). Gas zones ordinarily fall in region B since the density is lower than that of a liquid filled zone of the same porosity, and the neutron-gamma log is higher.

It is also contemplated that the neutron gamma ray and scattered gamma ray signals may be analyzed by overlaying one with respect to the other. If they are overlaid with one of them reversed, corresponding deviations indicate liquid zones and deviations between them indicate gas. This method of analysis is illustrated in FIG. 8 and described below.

Referring now to FIG. 8, there is shown a cross-section of a bore hole 210 traversing a plurality of earth formations 211–220 and having suspended therein a logging instrument 17 in accordance with the invention, such as that shown in FIG. 1. Plotted alongside the diagram of the bore hole and earth formations there is shown a typical logging record of the adjacent earth formations made by the instrument 17. This record shows a first trace H indicating radiation intensity signal of the first or neutron-gamma detector (increasing to the right as seen in the record) and representative of the hydrogen content of the formation and a second trace D, showing radiation intensity of the scattered gamma ray detector as it appears when inverted and plotted on the same record or recorded on a transparent medium and overlaid with the neutron-gamma record (decreasing to the right [increasing density] as seen in the record). The position of the H trace indicates the quantity of hydrogen, i.e., porosity of the formation with lower hydrogen content formations deflecting the neutron-gamma log to the right. Regions where the two traces are substantially in coincidence indicate the presence of a liquid, i.e. oil or water, since, in liquid filled zones, higher bulk densities are associated with lower porosities. Regions where the inverted density log is substantially lower than the neutron-gamma log, and the neutron-gamma log is high, are indicative of gas zones. Thus, in the region just below 4095 feet there is an indication of oil or water. In the region just below 4080 feet there is an indication of a washout. In the region just below 4060 feet there is an indication of a low hydrogen content and a low density. The interpretation of this zone would be that it is a high porosity zone containing dry gas. In the region just below 4040 feet there is an indication of a shale zone. In the 4110–20 region, there is an indication of a hard, low porosity liquid filled zone.

In accordance with a further advantageous aspect of the present invention for obtaining maximum logging information in the vicinity of the bottom of a bore hole, the logging instrument is constructed in such manner that the neutron and gamma ray sources may be readily interchanged. In particular, it is contemplated that a logging run should be conducted as herein described in order to obtain the respective neutron gamma and scattered gamma ray logging signals with the scattered gamma ray source and detector in the lower portion of the logging instrument, as shown in the drawings. Then it is contemplated that the gamma ray source should be removed from the lower end of the instrument and replaced by the neutron source. Next the logging instrument is returned to the bore hole and run to the bottom of the bore hole. This permits the neutron source and scattered gamma detector to be used to obtain a neutron gamma ray signal of the lower portion of the hole corresponding to the portion observed by the scattered gamma ray instrument. Albeit that this signal may be subject to some interference from chlorine which may be present, nevertheless, it provides useful information for correlation of the scattered gamma ray log and which may be of very great value in analyzing a portion of the formation which, from other information on the bore hole including the scattered gamma ray log, may indicate the desirability of further drilling activity or other operations in the bore hole.

It is deemed important that the scattered gamma ray instrumentation be positioned at the lower end of the logging instrument in order that this method of analyzing the lower portion of the bore hole by substitution of the neutron source for the gamma ray source may be carried out. If the neutron-gamma ray instrumentation were positioned in the lower end of the logging instrument it would not be feasible to substitute the sources inasmuch as the detecting equipment for the neutron-gamma ray log cannot be employed to produce a satisfactory gamma ray log.

In order to carry out this substitution technique, it is contemplated that the neutron source should be of such size as to fit in with the neutron or gamma ray source chamber and preferably the respective sources should be of approximately the same size so that they may be inserted in bores of approximately the same diameter in the respective ends of the logging instrument. Suitable lead spacer material may be employed to account for any disparity in size between the two sources. Appropriate removable cover plugs may be employed as shown to seal the housing of the logging instrument.

In accordance with this invention it is contemplated that the logging instrument should be provided with caliper means for continuously indicating the size of the bore hole throughout the well log for correlation with the detected gamma ray signals. Caliper information on the bore hole is particularly useful when the log is conducted in regions of low porosity formations in which case the accuracy of the scattered gamma density measurement is of greater importance in interpreting the logging signal. In such cases the caliper information is useful in improving the accuracy of the scattered gamma ray density log.

Although not specifically illustrated, it is noted that the logging instrument according to the present invention may include means for locating casing collars along the traverse of the bore hole and transmitting a casing collar signal to the surface in correlation with the logging instrument. It is also contemplated that the casing collar location may be determined by observation of collar reflections or pips on the gamma ray logging signal due to the increased thickness of the casing at the location of each collar.

In accordance with a further aspect of the herein disclosed invention, it is contemplated that the neutron interaction material in the vicinity of the neutron-gamma ray detector may be placed around the outside of the casing of the logging instrument in the vicinity of the detector, rather than inside the casing as shown in the drawings. For example, this aspect may advantageously be carried out by plating the outside of the logging instrument in the vicinity of the neutron-gamma ray detector with a predetermined quantity of cadmium and an external layer of epoxy resin in order to provide for effective neutralization of the effective chlorine upon the neutron-gamma ray log, as discussed in detail hereinabove.

The subject matter of this application is closely related to certain subject matter disclosed and claimed in copending applications Serial Nos. 820,236, 820,237, 820,240 and 820,241.

Obviously many modifications and variations of the invention, as hereinbefore set forth, may be made without departing from the spirit and scope thereof, and therefore only such limitations should be imposed as are indicated in the appended claims.

I claim:

1. Apparatus for conducting a radioactivity well log comprising an instrument housing adapted to be passed through a bore hole traversing a plurality of earth formations, a source of fast neutrons positioned at one end of said housing, a first detecting unit quantitatively sensitive to gamma rays returning to the bore hole as a result of irradiation of the formation by neutrons from the source and which is adapted and arranged to provide an output signal primarily indicative of the presence of hydrogen in said formation, said detecting unit comprising a gamma radiation detector and a predetermined quantity of neutron absorbing material positioned in the vicinity of said detector, said neutron absorbing material being characterized by the emission of radiation to which the detector is sensitive in response to the capture of a neutron, said detector being substantially unshielded with respect to said radiation emitted from said neutron absorbing material such that said detector is exposed to at least a major portion of said radiation emitted from said neutron absorbing material and traveling toward said detector, whereby the first detecting unit is sensitive to both neutron-gamma radiation emitted from the formation and thermal neutron radiation emitted from the formation and captured by said neutron absorbing material so that the first detecting unit is rendered substantially insensitive to the presence of chlorine, a source of gamma radiation positioned at the end of said housing remote from said fast neutron source, a second radiation detecting unit positioned within said housing and being adapted to provide a signal proportional to the intensity of gamma radiation returning to the bore hole as a result of irradiation by gamma rays from said gamma ray source, and means for continuously urging said instrument against a side of the bore hole as the instrument is passed therethrough.

2. Apparatus for conducting a radioactivity well log comprising an elongated instrument housing adapted to be passed through a bore hole traversing a plurality of earth formations, a source of fast neutrons positioned at the upper end of said housing, a first radiation detecting unit quantitatively sensitive to gamma rays returning to the bore hole as a result of irradiation of the formation by neutrons from said neutron source and which is adapted and arranged to provide an output signal primarily indicative of the presence of hydrogen in said formation and substantially insensitive to the presence of chlorine, said first detecting unit comprising a gamma radiation detector and a predetermined quantity of a neutron absorbing material positioned in the vicinity of said detector, said neutron absorbing material being characterized by the emission of radiation to which the detector is sensitive in response to the absorption of neutron radiation, said detector being substantially unshielded with respect to said radiation emitted from said neutron absorbing material such that said detector is exposed to at least a major portion of said radiation emitted from said neutron absorbing material and traveling toward said detector, whereby said detector is rendered sensitive to both neutron-gamma radiation and thermal neutron radiation in the borehole resulting from said irradiation of the formation by neutrons, a source of gamma radiation positioned at the lower end of said housing, a second radiation detecting unit positioned within said housing and being adapted to provide a signal proportional to the intensity of gamma radiation returning to the bore hole as a result of irradiation by gamma rays from said gamma ray source, said instrument being adapted and arranged for substitution of said neutron source for said gamma ray source at the lower end of the housing, and means for continuously urging said instrument against a side of the bore hole as the instrument is passed therethrough.

3. Apparatus for conducting a radioactivity well log comprising an instrument housing adapted to be passed through a bore hole traversing a plurality of earth formations, a source of fast neutrons positioned at one end of said housing, a first detecting unit quantitatively sensitive to gamma rays returning to the bore hole as a result of irradiation of the formation by neutrons from the source and which is adapted and arranged to provide an output signal primarily indicative of the presence of hydrogen in said formation, said detecting unit comprising a scintillation type detector of gamma rays and a predetermined quantity of neutron absorbing material positioned in the vicinity of said detector, said neutron absorbing material being characterized by the emission of radiation to which the detector is sensitive in response to the capture of a neutron, said detector being substantially unshielded with respect to said radiation emitted from said neutron absorbing material such that said detector is exposed to at least a major portion of said radiation emitted from said neutron absorbing material and traveling toward said detector, whereby the first detecting unit is sensitive to both neutron-gamma radiation emitted from the formation and thermal neutron radiation emitted from the formation and captured by said neutron absorbing material so that the first detecting unit is rendered substantially insensitive to the presence of chlorine, a source of gamma radiation positioned at the end of said housing remote from said fast neutron source, a second scintillation type radiation detecting unit positioned within said housing and being adapted to provide a signal proportional to the intensity of gamma radiation returning to the bore hole as a result of irradiation by gamma rays from said gamma ray source.

4. Apparatus according to claim 3 wherein the scintillation detector of said first detecting unit is biased to exclude the detection of gamma radiation having an electron energy below about 1.8 million electron volts.

5. Apparatus for conducting a radioactivity well log comprising an instrument housing adapted to be passed through a bore hole traversing a plurality of earth formations, a source of fast neutrons positioned at one end of said housing, a first detecting unit quantitatively sensitive to gamma rays returning to the bore hole as a result of irradiation of the formation by neutrons from the source and which is adapted and arranged to provide an output signal primarily indicative of the presence of hydrogen in said formation, said detecting unit comprising a high efficiency multiple plate cathode type detector of gamma rays and a predetermined quantity of neutron absorbing material positioned in the vicinity of said detector, said neutron absorbing material being characterized by the emission of radiation to which the detector is sensitive in response to the capture of a neutron, said detector being substantially unshielded with respect to said radiation emitted from said neutron absorbing material such that said detector is exposed to at least a major portion of said radiation emitted from said neutron absorbing material and traveling toward said detector, whereby the first detecting unit is sensitive to both neutron-gamma radiation emitted from the formation and thermal neutron radiation emitted from the formation and captured by said neutron absorbing material so that the first detecting unit is rendered substantially insensitive to the presence of chlorine, a source of gamma radiation positioned at the end of said housing remote from said fast neutron source, a second high efficiency multiple plate cathode type radiation detecting unit positioned within said housing and being adapted to provide a signal proportional to the intensity of gamma radiation returning to the bore hole as a result of irradiation by gamma rays from said gamma ray source.

6. Apparatus according to claim 5 further characterized in that the instrument is adapted and arranged for substitution of the neutron source for the gamma ray source at the lower end of the housing so that a neutron gamma ray log may be conducted employing the thus substituted neutron source together with the second radiation detecting unit.

7. Apparatus for conducting a radioactivity well log comprising an instrument housing adapted to be passed through a bore hole traversing a plurality of earth formations, a source of fast neutrons positioned at one end of said housing, a first detecting unit quantitatively sensitive to gamma rays returning to the bore hole as a result of irradiation of the formation by neutrons from the source and which is adapted and arranged to provide an output signal primarily indicative of a predetermined characteristic of said formation, said detecting unit comprising a gamma radiation detector and a predetermined quantity of neutron absorbing material positioned in the vicinity of said detector, said neutron absorbing material being characterized by the emission of radiation to which the detector is sensitive in response to the capture of a neutron, said detector being substantially unshielded with respect to said radiation emitted from said neutron absorbing material such that said detector is exposed to at least a major portion of said radiation emitted from said neutron absorbing material and traveling toward said detector whereby the first detecting unit is sensitive to both neutron-gamma radiation emitted from the formation and thermal neutron radiation emitted from the formation and captured by said neutron absorbing material so that the first detecting unit is rendered substantially insensitive to the presence of chlorine, a source of gamma radiation positioned at the end of said housing remote from said fast neutron source, a second radiation detecting unit positioned within said housing and being adapted to provide a signal proportional to the intensity of gamma radiation returning to the bore hole as a result of irradiation by gamma rays from said gamma ray source, and means for continuously urging said instrument against a side of the bore hole as the instrument is passed therethrough.

8. In a system for conducting a radioactivity well log comprising a logging instrument adapted to be passed through a borehole traversing a plurality of earth formations, said instrument including means comprising a source of neutrons for irradiating earth formations along the traverse of the borehole, radiation detecting means quantitatively sensitive to the intensity of radiations occurring in the borehole as a result of the irradiation of the earth formations by neutrons from said source, said detecting means including first means for deriving a first signal which varies as a function of radiation resulting from said irradiation and which varies primarily due to the presence of hydrogen to the substantial exclusion of the influence of chlorine which may also be present, said first means comprising means for selectively detecting the combination of a first radiation component comprising neutron-induced gamma radiation resulting from said irradiation which varies in intensity due to the presence of both hydrogen and chlorine together with a predetermined quantity of a second radiation component comprising neutron radiation resulting from said irradiation which varies in intensity inversely with the variations of said first radiation component due to the presence of chlorine, a source of gamma radiation positioned at the end of said housing remote from said neutron source, and second radiation detecting means for deriving a signal proportional to the intensity of gamma radiation returning to the borehole as a result of irradiation by gamma radiation from said gamma radiation source.

References Cited in the file of this patent
UNITED STATES PATENTS

| | | |
|---|---|---|
| Re. 24,383 | McKay | Oct. 29, 1957 |
| 2,469,461 | Russell | May 10, 1949 |
| 2,741,709 | Tirico et al. | Apr. 10, 1956 |
| 2,761,977 | McKay | Sept. 4, 1956 |
| 2,862,106 | Scherbatskoy | Nov. 25, 1958 |
| 2,933,609 | Norelius | Apr. 19, 1960 |